US012454664B2

(12) United States Patent
Nad et al.

(10) Patent No.: US 12,454,664 B2
(45) Date of Patent: Oct. 28, 2025

(54) HARD SURFACE CLEANING CONCENTRATE PACKET

(71) Applicant: Dow Silicones Corporation, Midland, MI (US)

(72) Inventors: Saugata Nad, Brussels (BE); Serge Creutz, Liege (BE); Christel Simon, Lobbes (BE)

(73) Assignee: Dow Silicones Corporation, Midland, MI (US)

( * ) Notice: Subject to any disclaimer, the term of this patent is extended or adjusted under 35 U.S.C. 154(b) by 394 days.

(21) Appl. No.: 18/008,353

(22) PCT Filed: Jul. 26, 2021

(86) PCT No.: PCT/US2021/043107

§ 371 (c)(1),
(2) Date: Dec. 5, 2022

(87) PCT Pub. No.: WO2022/026349

PCT Pub. Date: Feb. 3, 2022

(65) Prior Publication Data

US 2023/0287313 A1 Sep. 14, 2023

Related U.S. Application Data

(60) Provisional application No. 63/059,266, filed on Jul. 31, 2020.

(51) Int. Cl.

| | |
|---|---|
| ***C11D 3/00*** | (2006.01) |
| ***B08B 3/08*** | (2006.01) |
| ***C11D 1/72*** | (2006.01) |
| ***C11D 3/20*** | (2006.01) |
| ***C11D 3/30*** | (2006.01) |
| ***C11D 3/43*** | (2006.01) |
| ***C11D 17/04*** | (2006.01) |

(52) U.S. Cl.

CPC .............. *C11D 17/043* (2013.01); *B08B 3/08* (2013.01); *C11D 1/72* (2013.01); *C11D 3/2068* (2013.01); *C11D 3/30* (2013.01); *C11D 3/43* (2013.01); *C11D 2111/14* (2024.01)

(58) Field of Classification Search

None

See application file for complete search history.

(56) References Cited

U.S. PATENT DOCUMENTS

| | | | | |
|---|---|---|---|---|
| 6,956,070 | B2 | 10/2005 | Fujiwara et al. | |
| 9,550,963 | B2 | 1/2017 | Soontravanich et al. | |
| 2005/0187321 | A1 | 8/2005 | Verrall et al. | |
| 2007/0253926 | A1 | 11/2007 | Tadrowski et al. | |
| 2011/0278194 | A1* | 11/2011 | Zhu .......................... | C11D 3/30 206/524.7 |
| 2013/0196893 | A1* | 8/2013 | Busby ...................... | C11D 3/30 510/499 |
| 2017/0283748 | A1 | 10/2017 | Caires | |

FOREIGN PATENT DOCUMENTS

| | | |
|---|---|---|
| EP | 3418358 | 8/2019 |
| WO | 1997043378 | 11/1997 |
| WO | 2010049663 | 5/2010 |
| WO | 2012067962 | 5/2012 |

* cited by examiner

*Primary Examiner* — Necholus Ogden, Jr.
(74) *Attorney, Agent, or Firm* — Thomas S. Deibert

(57) ABSTRACT

A hard surface cleaning concentrate packet, is provided including: water soluble film; concentrated hard surface cleaning composition, comprising: glycol ether of formula I $$R^1—O—[CH_2CH(R^2)O]_a—H \quad (I)$$

wherein $R^1$ is a linear or branched $C_{2-8}$ alkyl group; wherein each $R^2$ is independently selected from hydrogen and methyl; and wherein a is 1 to 3; a nonionic surfactant of formula II (II)

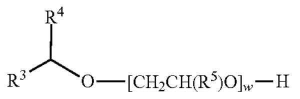

wherein w is 5 to 40; wherein $R^3$ is a hydrogen and a linear or branched $C_{1-20}$ alkyl group; wherein $R^4$ is selected from a linear or branched $C_{1-20}$ alkyl group and a linear or branched $C_{1-4}$ hydroxyalkyl group; wherein each $R^5$ is independently hydrogen, methyl, ethyl, n-propyl, iso-propyl, n-butyl, 2-butyl and 2-methyl-2-butyl; and with the proviso that sum of the total number of carbon atoms in $R^3$ and $R^4$ is 5 to 21; and a tertiary amine; wherein the water soluble film encapsulates the concentrated hard surface cleaning composition.

13 Claims, No Drawings

HARD SURFACE CLEANING CONCENTRATE PACKET

The present invention relates to a hard surface cleaning concentrate packet and a method of making and using the same. In particular, the present invention relates to a hard surface cleaning concentrate packet, comprising: a water soluble film; a concentrated hard surface cleaning composition, comprising: a glycol ether of formula I $$R^1—O—[CH_2CH(R^2)O]_a—H \qquad (I)$$

wherein $R^1$ is a linear or branched $C_{2-8}$ alkyl group, wherein each $R^2$ is independently selected from the group consisting of a hydrogen and a methyl group, and wherein a is 1 to 3; a nonionic surfactant of formula II (II)

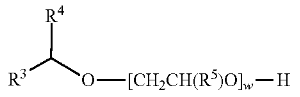

wherein w is an average of 5 to 40; wherein $R^3$ is selected from the group consisting of a hydrogen and a linear or branched $C_{1-20}$ alkyl group; wherein $R^4$ is selected from the group consisting of a linear or branched $C_{1-20}$ alkyl group and a linear or branched $C_{1-4}$ hydroxyalkyl group; wherein each $R^5$ is independently selected from the group consisting of a hydrogen, a methyl group, an ethyl group, a n-propyl group, an iso-propyl group, a n-butyl group, a 2-butyl group and a 2-methyl-2-butyl group; and with the proviso that sum of the total number of carbon atoms in $R^3$ and $R^4$ is 5 to 21; and a tertiary amine; wherein the water soluble film encapsulates the concentrated hard surface cleaning composition.

Cleaning hard surfaces is often accomplished through the use of a surface cleaner that is applied directly onto the surface, and then wiped off with a cloth, squeegee, or other means. Surface cleaners often include various combinations of anionic surfactants, nonionic surfactants, amphoteric surfactants, solvents and chelating agents. Other ingredients often include ammonia, acetic acid, and water.

Because the surface cleaners are generally effective in solution with water, it is possible to provide a concentrate that can be mixed with water to form the cleaning solution. The concentrate may be packaged and shipped separately from the majority of the water used to make the cleaning solution. The end user may then form the cleaning solution from water and the concentrate. A problem with the concentrates is that they benefit from precise mixing to ensure proper concentration of actives in the surface cleaner formed. Too dilute of a solution may result in poor cleaning performance. Too concentrated a solution may result in residue remaining on the cleaned surface. In addition, too concentrated of a cleaning solution may constitute a waste of the cleaning concentrate.

To alleviate concerns with improper dilution of the cleaning concentrate, it has been found beneficial to package single use, pre-measured amounts of cleaning concentrate in individual packages. A premeasured amount of cleaning concentrate is preferably added to a specific volume of water to form a properly concentrated cleaning solution. It is further possible to package the concentrate with a properly sized container such that the user simply adds the cleaning concentrate to the container and fills the remainder of the container with water. When the container is empty, a replacement package of concentrate may be added to the container, and the remainder once again filled with water.

It has also been found useful to package cleaning concentrates in water soluble packaging, particularly in single use, premeasured amounts. Forming the cleaning solution is made easier by the use of water soluble packaging containing the concentrate because the user may simply add the water soluble package to a container and then add the correct amount of water to form the desired cleaning solution. As the water soluble packaging dissolves, the cleaner is released and forms a cleaning solution having the proper concentration of cleaner.

One problem with conventionally packaged hard surface cleaning concentrates in water soluble packaging is that hard surface cleaning use formulations formed therewith are not particularly effective for cleaning oily and greasy soils from hard surfaces.

Accordingly, there remains a continuing need for hard surface cleaning concentrate packets for use in prepared hard surface cleaning use compositions that are effective for removing oily and greasy soils from hard surfaces.

The present invention provides a hard surface cleaning concentrate packet, comprising: a water soluble film; a concentrated hard surface cleaning composition, comprising: a glycol ether of formula I $$R^1—O—[CH_2CH(R^2)O]_a—H \qquad (I)$$

wherein $R^1$ is a linear or branched $C_{2-8}$ alkyl group, wherein each $R^2$ is independently selected from the group consisting of a hydrogen and a methyl group, and wherein a is 1 to 3; a nonionic surfactant of formula II (II)

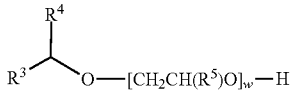

wherein w is an average of 5 to 40; wherein $R^3$ is selected from the group consisting of a hydrogen and a linear or branched $C_{1-20}$ alkyl group; wherein $R^4$ is selected from the group consisting of a linear or branched $C_{1-20}$ alkyl group and a linear or branched $C_{1-4}$ hydroxyalkyl group; wherein each $R^5$ is independently selected from the group consisting of a hydrogen, a methyl group, an ethyl group, a n-propyl group, an iso-propyl group, a n-butyl group, a 2-butyl group and a 2-methyl-2-butyl group; and with the proviso that sum of the total number of carbon atoms in $R^3$ and $R^4$ is 5 to 21; and a tertiary amine; wherein the water soluble film encapsulates the concentrated hard surface cleaning composition.

The present invention provides a hard surface cleaning concentrate packet, comprising: a water soluble film; a concentrated hard surface cleaning composition, comprising: a glycol ether of formula Ia (Ia)

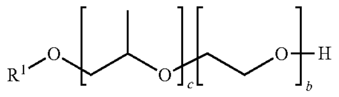

wherein $R^1$ is a linear or branched $C_{2-8}$ alkyl group, wherein b is an average of 0 to 3, wherein c is an average of 0 to 3, and with the proviso that b+c is an average of 1 to 3; a nonionic surfactant of formula IIa (IIa)

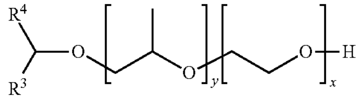

wherein x is an average of 8 to 10; wherein y is an average of 0 to 6; wherein $R^3$ is selected from the group consisting of a hydrogen and a linear or branched $C_{1-15}$ alkyl group; wherein $R^4$ is selected from the group consisting of a linear or branched $C_{1-15}$ alkyl group and a linear or branched $C_{1-3}$ hydroxyalkyl group; and with the proviso that the sum of the total number of carbon atoms in $R^3$ and $R^4$ is 6 to 20; and a tertiary amine; wherein the water soluble film encapsulates the concentrated hard surface cleaning composition.

The present invention provides a method of making a hard surface cleaning concentrate packet, comprising: providing a water soluble film; selecting a glycol ether of formula I $$R^1—O—[CH_2CH(R^2)O]_a—H \quad (I)$$

wherein $R^1$ is a linear or branched $C_{2-8}$ alkyl group, wherein each $R^2$ is independently selected from the group consisting of a hydrogen and a methyl group, and wherein a is 1 to 3; selecting a nonionic surfactant of formula II (II)

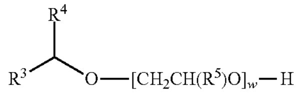

wherein w is an average of 5 to 40; wherein $R^3$ is selected from the group consisting of a hydrogen and a linear or branched $C_{1-20}$ alkyl group; wherein $R^4$ is selected from the group consisting of a linear or branched $C_{1-20}$ alkyl group and a linear or branched $C_{1-4}$ hydroxyalkyl group; wherein each $R^5$ is independently selected from the group consisting of a hydrogen, a methyl group, an ethyl group, a n-propyl group, an iso-propyl group, a n-butyl group, a 2-butyl group and a 2-methyl-2-butyl group; and with the proviso that sum of the total number of carbon atoms in $R^3$ and $R^4$ is 5 to 21; selecting a tertiary amine; providing the selected glycol ether of formula I; providing the selected nonionic surfactant of formula II; providing the selected tertiary amine; combining the selected glycol ether of formula I, the selected nonionic surfactant of formula II and the selected tertiary amine to form a concentrated hard surface cleaning composition; forming the hard surface cleaning concentrate packet by disposing the concentrated hard surface cleaning composition within an enclosed volume formed by water soluble film, wherein the water soluble film encapsulates the concentrated hard surface cleaning composition.

The present invention provides a method for removing oily, greasy, tough & stubborn soils from a hard surface, comprising: providing a soiled hard surface; providing a container; providing a dilution water; selecting a hard surface cleaning concentrate packet prepared according to the method of the present invention; providing the selected hard surface cleaning concentrate packet; combining the selected hard surface cleaning concentrate packet and the dilution water in the container to form a hard surface cleaning use composition; wetting the soiled hard surface with the hard surface cleaning use composition; and wiping the wetted soiled hard surface to provide a cleaned hard surface.

DETAILED DESCRIPTION

The hard surface cleaning concentrate packet of the present invention provides a concentrated hard surface cleaning composition with enhanced performance removing oily and greasy soil from hard surfaces (preferably, wherein the concentrated hard surface cleaning composition is easily diluted in room temperature water without the need to apply heat; preferably, wherein the concentrated hard surface cleaning composition does not exhibit undesirable ammonia odor upon dilution).

Unless otherwise indicated, ratios, percentages, parts, and the like are by weight. Weight percentages (or wt %) in the composition are percentages of dry weight, i.e., excluding any water that may be present in the composition. Percentages of monomer units in the polymer are percentages of solids weight, i.e., excluding any water present in a polymer emulsion.

Preferably, the hard surface cleaning concentrate packet of the present invention, comprises: a water soluble film (preferably, wherein the water soluble film has a disintegration time of less than 90 seconds as determined at 40° C. using distilled water according to MSTM 205 when measured independently from the concentrated hard surface cleaning composition); a concentrated hard surface cleaning composition, comprising: a glycol ether of formula I (preferably, 15 to 50 wt % (more preferably, 20 to 40 wt %; still more preferably, 25 to 30 wt %; most preferably, 26 to 28 wt %), based on weight of the concentrated hard surface cleaning composition, of the glycol ether of formula I)

$$R^1—O—[CH_2CH(R^2)O]_a—H \quad (I)$$

wherein $R^1$ is a linear or branched $C_{2-8}$ alkyl group; wherein each $R^2$ is independently selected from the group consisting of a hydrogen and a methyl group; and wherein a is 1 to 3; a nonionic surfactant of formula II (preferably, 20 to 60 wt % (more preferably, 25 to 50 wt %; still more preferably, 30 to 40 wt %; most preferably, 34 to 38 wt %), based on weight of the concentrated hard surface cleaning composition, of the nonionic surfactant of formula II)

(II)

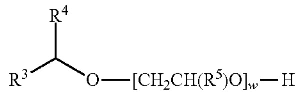

wherein w is an average of 5 to 40 (preferably, 7 to 27; more preferably, 8 to 20; most preferably, 7 to 12); wherein $R^3$ is selected from the group consisting of a hydrogen and a linear or branched $C_{1-20}$ alkyl group; wherein $R^4$ is selected from the group consisting of a linear or branched $C_{1-20}$ alkyl group and a linear or branched $C_{1-4}$ hydroxyalkyl group; and wherein each $R^5$ is independently selected from the group consisting of a hydrogen, a methyl group, an ethyl group, a n-propyl group, an iso-propyl group, a n-butyl group, a 2-butyl group and a 2-methyl-2-butyl group (preferably, a hydrogen, a methyl group and an ethyl group; more preferably, a hydrogen and a methyl group; most preferably, a hydrogen); with the proviso that sum of the total number of carbon atoms in $R^3$ and $R^4$ is 5 to 21; and a tertiary amine (preferably, 15 to 60 wt % (more preferably, 20 to 50 wt %; still more preferably, 25 to 40 wt %; most preferably, 27 to 34 wt %), based on weight of the concentrated hard surface cleaning composition, of the tertiary amine)(preferably, wherein the tertiary amine is of formula III

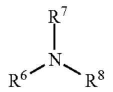

wherein $R^6$, $R^7$ and $R^8$ are independently selected from a linear or branched $C_{1-20}$ alkyl group and a linear or branched $C_{1-20}$ hydroxyalkyl group (preferably; a linear or branched $C_{1-10}$ alkyl group and a linear or branched $C_{1-10}$ hydroxyalkyl group; more preferably, a branched $C_{3-5}$ alkyl group or a branched $C_{3-5}$ hydroxyalkyl group; most preferably, a branched $C_3$ hydroxyalkyl group); wherein the water soluble film encapsulates the concentrated hard surface cleaning composition.

Preferably, the hard surface cleaning concentrate packet of the present invention, comprises: a water soluble film, wherein the water soluble film has a disintegration time of less than 90 seconds as determined at 40° C. using distilled water according to MSTM 205 when measured independently from the concentrated hard surface cleaning composition. More preferably, the hard surface cleaning concentrate packet of the present invention, comprises: a water soluble film, wherein the water soluble film has a disintegration time of less than 90 (preferably, less than 60; more preferably, less than 40; most preferably, less than 30) seconds as determined at 40° C. (preferably, at 30° C.; more preferably, at 25° C.; most preferably, at 21° C.) using distilled water according to MSTM 205 when measured independently from the concentrated hard surface cleaning composition. Most preferably, the hard surface cleaning concentrate packet of the present invention, comprises: a water soluble film, wherein the water soluble film has a disintegration time of less than 90 (preferably, less than 60; more preferably, less than 40; most preferably, less than 30) seconds as determined at 40° C. (preferably, at 30° C.; more preferably, at 25° C.; most preferably, at 21° C.) using distilled water according to MSTM 205 when measured independently from the concentrated hard surface cleaning composition; and wherein the water soluble film comprises (consists essential of, or consists of) a material selected from the group consisting of polyvinyl alcohol, polyvinyl acetate, hydrolyzed polyvinyl acetate (preferably, polyvinyl acetate that is 88 to 98% hydrolyzed), gelatin and combinations thereof. Preferably, the water soluble film includes polyvinyl alcohol. Such water soluble films include, for example, those commercially available from Monosol under trade names A127, A200, L330, L336, L336 Blue, L711, L711 Blue, M1030, M1030, M2000, M2631A, M3030, M6030, M7030, M7031, M7061, M8310, M8440, M8534, M8630, M8900 and M9500.

Preferably, the hard surface cleaning concentrate packet of the present invention, comprises: a single layer or multiple layers of the water soluble film. Preferably, each water soluble film layer has a thickness of 5 to 200 (preferably, 5 to 100; more preferably, 20 to 85; still more preferably, 30 to 70; most preferably, 40 to 60) microns.

Preferably, the hard surface cleaning concentrate packet of the present invention, comprises: a concentrated hard surface cleaning composition, comprising: 15 to 50 wt % (preferably, 20 to 40 wt %; more preferably, 25 to 30 wt %; most preferably, 26 to 28 wt %), based on weight of the concentrated hard surface cleaning composition, of a glycol ether of formula I $$R^1—O—[CH_2CH(R^2)O]_a—H \quad (I)$$

wherein $R^1$ is a linear or branched $C_{2-8}$ alkyl group (preferably, a linear or branched $C_{3-8}$ alkyl group; more preferably, a linear $C_{4-7}$ alkyl group; most preferably, a linear $C_6$ alkyl group); wherein each $R^2$ is independently selected from the group consisting of a hydrogen and a methyl group (preferably, wherein each $R^2$ is a hydrogen); and wherein a is 1 to 3 (preferably, wherein a is 2). More preferably, the hard surface cleaning concentrate packet of the present invention, comprises: a concentrated hard surface cleaning composition, comprising: 15 to 50 wt % (preferably, 20 to 40 wt %; more preferably, 25 to 30 wt %; most preferably, 26 to 28 wt %), based on weight of the concentrated hard surface cleaning composition, of a glycol ether of formula I; wherein $R^1$ is a linear $C_{4-7}$ alkyl group and wherein a is 2. Most preferably, the hard surface cleaning concentrate packet of the present invention, comprises: a concentrated hard surface cleaning composition, comprising: 15 to 50 wt % (preferably, 20 to 40 wt %; more preferably, 25 to 30 wt %; most preferably, 26 to 28 wt %), based on weight of the concentrated hard surface cleaning composition, of a glycol ether of formula I; wherein $R^1$ is a linear $C_6$ alkyl group and wherein a is 2.

Preferably, the hard surface cleaning concentrate packet of the present invention, comprises: a concentrated hard surface cleaning composition, comprising: 15 to 50 wt % (preferably, 20 to 40 wt %; more preferably, 25 to 30 wt %; most preferably, 26 to 28 wt %), based on weight of the concentrated hard surface cleaning composition, of a glycol ether of formula I, wherein the glycol ether of formula I is of formula Ia (Ia)

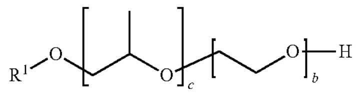

wherein $R^1$ is a linear or branched $C_{2-8}$ alkyl group (preferably, a linear or branched $C_{3-8}$ alkyl group; more preferably, a linear $C_{4-7}$ alkyl group; most preferably, a linear $C_6$ alkyl group); wherein b is an average of 0 to 3 (preferably, 0 to 2; more preferably 2); wherein c is an average of 0 to 3 (preferably, 0 to 2; more preferably 0); and with the proviso that b+c is an average of 1 to 3 (preferably, 2 to 3; more preferably, 2). More preferably, the hard surface cleaning concentrate packet of the present invention, comprises: a concentrated hard surface cleaning composition, comprising: 15 to 50 wt % (preferably, 20 to 40 wt %; more preferably, 25 to 30 wt %; most preferably, 26 to 28 wt %), based on weight of the concentrated hard surface cleaning composition, of a glycol ether of formula Ia; wherein $R^1$ is a linear $C_{4-7}$ alkyl group; wherein b is 2; and wherein c is 0. Most preferably, the hard surface cleaning concentrate packet of the present invention, comprises: a concentrated hard surface cleaning composition, comprising: 15 to 50 wt % (preferably, 20 to 40 wt %; more preferably, 25 to 30 wt %; most preferably, 26 to 28 wt %), based on weight of the concentrated hard surface cleaning composition, of a glycol ether of formula Ia; wherein $R^1$ is a linear $C_6$ alkyl group; wherein b is 2; and wherein c is 0.

Preferably, the hard surface cleaning concentrate packet of the present invention, comprises: a concentrated hard surface cleaning composition, comprising: 20 to 60 wt % (preferably, 25 to 50 wt %; more preferably, 30 to 40 wt %;

most preferably, 34 to 38 wt %), based on weight of the concentrated hard surface cleaning composition, of a nonionic surfactant of formula II (II)

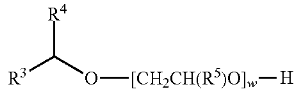

wherein w is an average of 5 to 40 (preferably, 7 to 27; more preferably, 8 to 20; most preferably, 7 to 12); wherein $R^3$ is selected from the group consisting of a hydrogen and a linear or branched $C_{1-20}$ alkyl group (preferably, a hydrogen, and a linear or branched $C_{1-15}$ alkyl group; more preferably, a linear $C_{1-15}$ alkyl group); wherein $R^4$ is selected from the group consisting of a linear or branched $C_{1-20}$ alkyl group and a linear or branched $C_{1-4}$ hydroxyalkyl group (preferably, a linear or branched $C_{1-15}$ alkyl group and a linear or branched $C_{1-4}$ hydroxyalkyl group; more preferably, a linear $C_{1-15}$ alkyl group and a linear or branched $C_{1-3}$ hydroxyalkyl group; most preferably, a linear $C_{1-15}$ alkyl group); wherein each $R^5$ is independently selected from the group consisting of a hydrogen, a methyl group, an ethyl group, a n-propyl group, an iso-propyl group, a n-butyl group, a 2-butyl group and a 2-methyl-2-butyl group (preferably, a hydrogen, a methyl group and an ethyl group; more preferably, a hydrogen and a methyl group; most preferably, a hydrogen); and with the proviso that sum of the total number of carbon atoms in $R^3$ and $R^4$ is 5 to 21 (preferably, 6 to 20 carbon atoms; more preferably, 7 to 18 carbon atoms; most preferably, 11 to 15 carbon atoms). More preferably, the hard surface cleaning concentrate packet of the present invention, comprises: a concentrated hard surface cleaning composition, comprising: 20 to 60 wt % (preferably, 25 to 50 wt %; more preferably, 30 to 40 wt %; most preferably, 34 to 38 wt %), based on weight of the concentrated hard surface cleaning composition, of a nonionic surfactant of formula II; wherein w is an average of 8 to 16; wherein $R^3$ is selected from the group consisting of a hydrogen and a linear $C_{1-15}$ alkyl group; wherein $R^4$ is selected from the group consisting of a linear or branched $C_{1-15}$ alkyl group and a linear or branched $C_{1-4}$ hydroxyalkyl; and with the proviso that the sum of the total number of carbon atoms in $R^3$ and $R^4$ is 6 to 20. Most preferably, the hard surface cleaning concentrate packet of the present invention, comprises: a concentrated hard surface cleaning composition, comprising: 20 to 60 wt % (preferably, 25 to 50 wt %; more preferably, 30 to 40 wt %; most preferably, 34 to 38 wt %), based on weight of the concentrated hard surface cleaning composition, of a nonionic surfactant of formula II; wherein w is an average of 7 to 12; wherein $R^3$ is selected from the group consisting of a hydrogen and a linear $C_{1-15}$ alkyl group; wherein $R^4$ is selected from the group consisting of a linear $C_{1-15}$ alkyl group and a linear or branched $C_{1-3}$ hydroxyalkyl group; and with the proviso that the sum of the total number of carbon atoms in $R^3$ and $R^4$ is 7 to 18.

Preferably, the hard surface cleaning concentrate packet of the present invention, comprises: a concentrated hard surface cleaning composition, comprising: 20 to 60 wt % (preferably, 25 to 50 wt %; more preferably, 30 to 40 wt %; most preferably, 34 to 38 wt %), based on weight of the concentrated hard surface cleaning composition, of a nonionic surfactant of formula II, wherein the nonionic surfactant of formula II is of formula IIa (IIa)

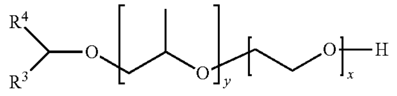

wherein x is an average of 5 to 15 (preferably, 7 to 12; more preferably, 8 to 10); wherein y is an average of 0 to 15 (preferably, 0 to 10; more preferably, 0 to 8; most preferably, 0 to 6); wherein $R^3$ is selected from the group consisting of a hydrogen and a linear or branched $C_{1-20}$ alkyl group (preferably, a hydrogen and a linear or branched $C_{1-15}$ alkyl group; more preferably, a linear $C_{1-15}$ alkyl group); wherein $R^4$ is selected from the group consisting of a linear or branched $C_{1-20}$ alkyl group and a linear or branched $C_{1-4}$ hydroxyalkyl group (preferably, a linear or branched $C_{1-15}$ alkyl group and a linear or branched $C_{1-4}$ hydroxyalkyl group; more preferably, a linear $C_{1-15}$ alkyl group and a linear or branched $C_{1-3}$ hydroxyalkyl group; most preferably, a linear $C_{1-15}$ alkyl group); and with the proviso that the sum of the total number of carbon atoms in $R^3$ and $R^4$ is 5 to 21 (preferably, 6 to 20 carbon atoms; more preferably, 7 to 18 carbon atoms; most preferably, 11 to 15 carbon atoms). More preferably, the hard surface cleaning concentrate packet of the present invention, comprises: a concentrated hard surface cleaning composition, comprising: 20 to 60 wt % (preferably, 25 to 50 wt %; more preferably, 30 to 40 wt %; most preferably, 34 to 38 wt %), based on weight of the concentrated hard surface cleaning composition, of a nonionic surfactant of formula IIa; wherein x is an average of 8 to 10; wherein y is an average of 0 to 6; wherein $R^3$ is selected from the group consisting of a hydrogen and a linear $C_{1-15}$ alkyl group; wherein $R^4$ is selected from the group consisting of a linear or branched $C_{1-15}$ alkyl group and a linear or branched $C_{1-3}$ hydroxyalkyl group; and with the proviso that the sum of the total number of carbon atoms in $R^3$ and $R^4$ is 6 to 20. Most preferably, the hard surface cleaning concentrate packet of the present invention, comprises: a concentrated hard surface cleaning composition, comprising: 20 to 60 wt % (preferably, 25 to 50 wt %; more preferably, 30 to 40 wt %; most preferably, 34 to 38 wt %), based on weight of the concentrated hard surface cleaning composition, of a nonionic surfactant of formula IIa; wherein x is an average of 7 to 12; wherein y is 0; wherein $R^3$ is a linear $C_{1-15}$ alkyl group; wherein $R^4$ is a linear $C_{1-15}$ alkyl group; and with the proviso that the sum of the total number of carbon atoms in $R^3$ and $R^4$ is 7 to 18.

Preferably, the hard surface cleaning concentrate packet of the present invention, comprises: a concentrated hard surface cleaning composition, comprising: 15 to 60 wt % (preferably, 20 to 50 wt %; more preferably, 25 to 40 wt %; most preferably, 27 to 34 wt %), based on weight of the concentrated hard surface cleaning composition, of a tertiary amine. More preferably, the hard surface cleaning concentrate packet of the present invention, comprises: a concentrated hard surface cleaning composition, comprising: 15 to 60 wt % (preferably, 20 to 50 wt %; more preferably, 25 to 40 wt %; most preferably, 27 to 34 wt %), based on weight of the concentrated hard surface cleaning composition, of a tertiary amine; wherein the tertiary amine is according to formula III

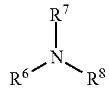

wherein $R^6$, $R^7$ and $R^8$ are independently selected from a linear or branched $C_{1-20}$ alkyl group (preferably; a linear or branched $C_{1-10}$ alkyl group and a linear or branched $C_{1-10}$ hydroxyalkyl group; more preferably, a branched $C_{3-5}$ alkyl group and a branched $C_{3-5}$ hydroxyalkyl group; most preferably, a branched $C_3$ hydroxyalkyl group). Still more preferably, the hard surface cleaning concentrate packet of the present invention, comprises: a concentrated hard surface cleaning composition, comprising: 15 to 60 wt % (preferably, 20 to 50 wt %; more preferably, 25 to 40 wt %; most preferably, 27 to 34 wt %), based on weight of the concentrated hard surface cleaning composition, of a tertiary amine of formula III; wherein $R^6$, $R^7$ and $R^8$ are independently selected from the group consisting of a linear or branched $C_{1-10}$ alkyl group and a linear or branched $C_{1-10}$ hydroxyalkyl group. Yet more preferably, the hard surface cleaning concentrate packet of the present invention, comprises: a concentrated hard surface cleaning composition, comprising: 15 to 60 wt % (preferably, 20 to 50 wt %; more preferably, 25 to 40 wt %; most preferably, 27 to 34 wt %), based on weight of the concentrated hard surface cleaning composition, of a tertiary amine of formula III; wherein $R^6$, $R^7$ and $R^8$ are independently selected from the group consisting of a branched $C_{3-5}$ alkyl group and a branched $C_{3-5}$ hydroxyalkyl group. Most preferably, the hard surface cleaning concentrate packet of the present invention, comprises: a concentrated hard surface cleaning composition, comprising: 15 to 60 wt % (preferably, 20 to 50 wt %; more preferably, 25 to 40 wt %; most preferably, 27 to 34 wt %), based on weight of the concentrated hard surface cleaning composition, of a tertiary amine of formula III; wherein $R^6$, $R^7$ and $R^8$ are a branched $C_3$ hydroxyalkyl group.

The concentrated hard surface cleaning composition of the present invention, optionally further comprises an optional ingredient. Preferably, the concentrated hard surface cleaning composition of the present invention, further comprises an optional ingredient; wherein the optional ingredient is selected from the group consisting of a salt, an enzyme, a corrosion inhibitor, an acid, a bleaching agent, an abrasive, an antimicrobial agent (e.g., phenoxyethanol, benzalkonium chloride), a rheology modifier, a film former (e.g., Acusol™ Pro), a pH adjuster, a buffering agent, an aesthetic colorant, a fragrance and mixtures thereof.

Preferably, the hard surface cleaning concentrate packet of the present invention, comprises: a concentrated hard surface cleaning composition; wherein the concentrated hard surface cleaning composition includes an aesthetic colorant. More preferably, the hard surface cleaning concentrate packet of the present invention, comprises: a concentrated hard surface cleaning composition; wherein the concentrated hard surface cleaning composition includes 0.05 to 3 wt % (preferably, 0.1 to 2.5 wt %; more preferably, 0.5 to 2.0 wt %; most preferably, 0.5 to 1.5 wt %), based on weight of the concentrated hard surface cleaning composition, of an aesthetic colorant. Still more preferably, the hard surface cleaning concentrate packet of the present invention, comprises: a concentrated hard surface cleaning composition; wherein the concentrated hard surface cleaning composition includes 0.05 to 3 wt % (preferably, 0.1 to 2.5 wt %; more preferably, 0.5 to 2.0 wt %; most preferably, 0.5 to 1.5 wt %), based on weight of the concentrated hard surface cleaning composition, of an aesthetic colorant; wherein the aesthetic colorant is selected from the group consisting of dyes (e.g., small molecule dyes and polymeric dyes), dye-clay conjugates and pigments. Most preferably, the hard surface cleaning concentrate packet of the present invention, comprises: a concentrated hard surface cleaning composition; wherein the concentrated hard surface cleaning composition includes 0.05 to 3 wt % (preferably, 0.1 to 2.5 wt %; more preferably, 0.5 to 2.0 wt %; most preferably, 0.5 to 1.5 wt %), based on weight of the concentrated hard surface cleaning composition, of an aesthetic colorant; wherein the aesthetic colorant is selected from the group consisting of dyes (e.g., small molecule dyes and polymeric dyes), dye-clay conjugates, pigments and Liquitint® polymeric colorants (available from Milliken & Company); wherein the aesthetic colorant contains at least one chromophore constituent selected from the group consisting of acridines, anthraquinones, azines, azos, benzodifuranes, benzodifuranones, carotenoids, coumarins, cyanines, diazahemicyanines, diphenylmethanes, formazans, hemicyanines, indigoids, methanes, methines, naphthalimides, naphthoquinones, nitros, nitrosos, oxazines, phenothiazine, phthalocyanines, pyrazoles, pyrazolones, quinolones, stilbenes, styryls, triarylmethanes, xanthenes and mixtures thereof. Aesthetic colorants include, for example, polymeric colorants such as Liquitint® Yellow EC, Liquitint® Red OC, Liquitint® Blue AH, Liquitint® Blue BB, Liquitint® Blue 275, Liquitint® Blue 297, Liquitint® Blue BB, Cyan 15, Liquitint® Green 101, Liquitint® Orange 272, Liquitint® Orange 255, Liquitint® Pink AM, Liquitint® Pink AMC, Liquitint® Pink ST, Liquitint® Violet 129, Liquitint® Violet 291, Liquitint® Violet LS, Liquitint® Yellow FT, Liquitint® Blue Buf, Liquitint® Pink AM, Liquitint® Pink PV, Acid Blue 80, Acid Blue 182, Acid Red 33, Acid Red 52, Acid Violet 48, Acid Violet 126, Acid Blue 9, Acid Blue 1 and mixtures thereof (preferably, a mixture of Liquitint® Yellow EC and Liquitint® Red OC).

Preferably, the hard surface cleaning concentrate packet of the present invention, comprises: a concentrated hard surface cleaning composition; wherein the concentrated hard surface cleaning composition includes a fragrance. More preferably, the hard surface cleaning concentrate packet of the present invention, comprises: a concentrated hard surface cleaning composition; wherein the concentrated hard surface cleaning composition includes 0.01 to 5 wt % (preferably, 0.1 to 4.5 wt %; more preferably, 1 to 4.25 wt %; most preferably, 2 to 4 wt %), based on weight of the concentrated hard surface cleaning composition, of a fragrance.

Preferably, the concentrated hard surface cleaning composition has a pH of $\leq 11$. More preferably, the concentrated hard surface cleaning composition has a pH of 5 to 10.5. Most preferably, the concentrated hard surface cleaning composition has a pH of 8 to 10.

Preferably, the concentrated hard surface cleaning composition of the present invention contains 0 to 10 wt % (preferably, 0 to 5 wt %; more preferably, 0 to 2.5 wt %; still more preferably, 0 to 2 wt %; yet more preferably, 0 to 1.5 wt %; most preferably, 0 to 1 wt %) of water.

Preferably, the concentrated hard surface cleaning composition of the present invention contains <0.01 wt % (preferably, <0.001 wt %; more preferably, <0.0001 wt %; still more preferably, <0.0001 wt %; most preferably, less than the detectable limit) of dispersant polymer. More preferably, the concentrated hard surface cleaning composition of the present invention contains <0.01 wt % (preferably, <0.001 wt %; more preferably, <0.0001 wt %; still more preferably, <0.0001 wt %; most preferably, less than the detectable limit) of dispersant polymer; wherein the dispersant polymer is selected from the group consisting of poly(acrylic acid), poly(acrylic acid/maleic acid) copolymers, poly(maleic acid/olefin) copolymers, phosphino carboxylated polymers and mixtures thereof.

Preferably, the concentrated hard surface cleaning composition of the present invention contains <5 wt % (preferably, 0 to 3 wt %; more preferably, 0 to 2.6 wt %) of quaternary ammonium compounds (e.g., benzalkonium).

Preferably, the concentrated hard surface cleaning composition of the present invention contains <0.01 wt % (preferably, <0.001 wt %; more preferably, <0.0001 wt %; still more preferably, <0.0001 wt %; most preferably, less than the detectable limit) of hydrotrope. More preferably, the concentrated hard surface cleaning composition of the present invention contains <0.01 wt % (preferably, <0.001 wt %; more preferably, <0.0001 wt %; still more preferably, <0.0001 wt %; most preferably, less than the detectable limit) of hydrotrope; wherein the hydrotrope is selected from the group consisting of calcium, sodium, potassium, ammonium and alkanol ammonium salts of xylene sulfonic acid; calcium, sodium, potassium, ammonium and alkanol ammonium salts of toluene sulfonic acid; calcium, sodium, potassium, ammonium and alkanol ammonium salts of ethylbenzene sulfonic acid; calcium, sodium, potassium, ammonium and alkanol ammonium salts of cumene sulfonic acid; and mixtures thereof.

Preferably, the method of making a hard surface cleaning concentrate packet of the present invention, comprises: providing a water soluble film (preferably, wherein the water soluble film has a disintegration time of less than 90 seconds as determined at 40° C. using distilled water according to MSTM 205 when measured independently from the concentrated hard surface cleaning composition); selecting a glycol ether of formula I $$R^1—O—[CH_2CH(R^2)O]_a—H \qquad (I)$$

wherein $R^1$ is a linear or branched $C_{2-8}$ alkyl group (preferably, a linear or branched $C_{3-8}$ alkyl group; more preferably, a linear $C_{4-7}$ alkyl group; most preferably, a linear $C_6$ alkyl group); wherein each $R^2$ is independently selected from the group consisting of a hydrogen and a methyl group (preferably, wherein each $R^2$ is a hydrogen); and wherein a is 1 to 3 (preferably, wherein a is 2); selecting a nonionic surfactant of formula II (II)

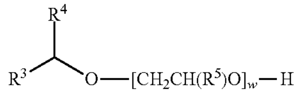

wherein w is an average of 5 to 40 (preferably, 7 to 27; more preferably, 8 to 20; most preferably, 7 to 12); wherein $R^3$ is selected from the group consisting of a hydrogen and a linear or branched $C_{1-20}$ alkyl group (preferably, a hydrogen, and a linear or branched $C_{1-15}$ alkyl group; more preferably, a linear $C_{1-15}$ alkyl group); wherein $R^4$ is selected from the group consisting of a linear or branched $C_{1-20}$ alkyl group and a linear or branched $C_{1-4}$ hydroxyalkyl group (preferably, a linear or branched $C_{1-15}$ alkyl group and a linear or branched $C_{1-4}$ hydroxyalkyl group; more preferably, a linear $C_{1-15}$ alkyl group and a linear or branched $C_{1-3}$ hydroxyalkyl group; most preferably, a linear $C_{1-15}$ alkyl group); wherein each $R^5$ is independently selected from the group consisting of a hydrogen, a methyl group, an ethyl group, a n-propyl group, an iso-propyl group, a n-butyl group, a 2-butyl group and a 2-methyl-2-butyl group (preferably, a hydrogen, a methyl group and an ethyl group; more preferably, a hydrogen and a methyl group; most preferably, a hydrogen); and with the proviso that sum of the total number of carbon atoms in $R^3$ and $R^4$ is 5 to 21 (preferably, 6 to 20 carbon atoms; more preferably, 7 to 18 carbon atoms; most preferably, 11 to 15 carbon atoms); and selecting a tertiary amine (preferably, wherein the tertiary amine is of formula III

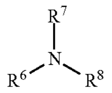

wherein $R^6$, $R^7$ and $R^8$ are independently selected from the group consisting of a linear or branched $C_{1-20}$ alkyl group and a $C_{1-20}$ hydroxyalkyl group (preferably; a linear or branched $C_{1-10}$ alkyl group and a linear or branched $C_{1-10}$ hydroxyalkyl group; more preferably, a branched $C_{3-5}$ alkyl group and a $C_{3-5}$ hydroxyalkyl group; most preferably, a branched $C_3$ hydroxyalkyl group); providing the selected glycol ether of formula I; providing the selected nonionic surfactant of formula II; providing the selected tertiary amine; combining the selected glycol ether of formula I, the selected nonionic surfactant of formula II and the selected tertiary amine to form a concentrated hard surface cleaning composition (preferably, wherein the concentrated hard surface cleaning composition comprises: 15 to 50 wt % (preferably, 20 to 40 wt %; more preferably, 25 to 30 wt %; most preferably, 26 to 28 wt %), based on weight of the concentrated hard surface cleaning composition, of the glycol ether of formula I; 20 to 60 wt % (preferably, 25 to 50 wt %; more preferably, 30 to 40 wt %; most preferably, 34 to 37 wt %), based on weight of the concentrated hard surface cleaning composition, of the nonionic surfactant of formula II; and 20 to 60 wt % (more preferably, 25 to 50 wt %; still more preferably, 30 to 40 wt %; most preferably, 33 to 37 wt %), based on weight of the concentrated hard surface cleaning composition, of the tertiary amine); forming the hard surface cleaning concentrate packet by disposing the concentrated hard surface cleaning composition within an enclosed volume formed by the water soluble film (preferably, wherein the water soluble film is configured into a water soluble film pouch)(the water soluble film pouch may have one or multiple cavities for receiving the concentrated hard surface cleaning composition, or portion thereof)(preferably, the water soluble film pouch has one cavity for receiving the concentrated hard surface cleaning composition), wherein the water soluble film encapsulates the concentrated hard surface cleaning composition.

Preferably, the method of making a hard surface cleaning concentrate packet of the present invention, comprises: providing a water soluble film (preferably, wherein the water soluble film has a disintegration time of less than 90 seconds as determined at 40° C. using distilled water according to MSTM 205 when measured independently from the concentrated hard surface cleaning composition); selecting a glycol ether of formula I, wherein the glycol ether of formula I is of formula Ia (Ia)

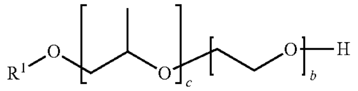

wherein $R^1$ is a linear or branched $C_{2-8}$ alkyl group (preferably, a linear or branched $C_{3-8}$ alkyl group; more preferably, a linear $C_{4-7}$ alkyl group; most preferably, a linear $C_6$ alkyl group); wherein b is an average of 0 to 3 (preferably, 0 to 2; more preferably 2); wherein c is an average of 0 to 3 (preferably, 0 to 2; more preferably 0); and with the proviso that b+c is an average of 1 to 3 (preferably, 2 to 3; more preferably, 2); selecting a nonionic surfactant of formula II, wherein the nonionic surfactant of formula II is of formula IIa

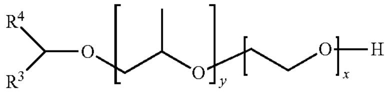

(IIa)

wherein x is an average of 5 to 15 (preferably, 7 to 12; more preferably, 8 to 10); wherein y is an average of 0 to 15 (preferably, 0 to 10; more preferably, 0 to 8; most preferably, 0 to 6); wherein $R^3$ is selected from the group consisting of a hydrogen and a linear or branched $C_{1-20}$ alkyl group (preferably, a hydrogen and a linear or branched $C_{1-15}$ alkyl group; more preferably, a linear $C_{1-15}$ alkyl group); wherein $R^4$ is selected from the group consisting of a linear or branched $C_{1-20}$ alkyl group and a linear or branched $C_{1-4}$ hydroxyalkyl group (preferably, a linear or branched $C_{1-15}$ alkyl group and a linear or branched $C_{1-4}$ hydroxyalkyl group; more preferably, a linear $C_{1-15}$ alkyl group and a linear or branched $C_{1-3}$ hydroxyalkyl group; most preferably, a linear $C_{1-15}$ alkyl group); and with the proviso that the sum of the total number of carbon atoms in $R^3$ and $R^4$ is 5 to 21 (preferably, 6 to 20 carbon atoms; more preferably, 7 to 18 carbon atoms; most preferably, 11 to 15 carbon atoms); and selecting a tertiary amine (preferably, wherein the tertiary amine is of formula III

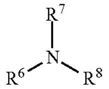

wherein $R^6$, $R^7$ and $R^8$ are independently selected from the group consisting of a linear or branched $C_{1-20}$ alkyl group and a linear or branched $C_{1-20}$ hydroxyalkyl group (preferably; a linear or branched $C_{1-10}$ alkyl group and a linear or branched $C_{1-10}$ hydroxyalkyl group; more preferably, a branched $C_{3-5}$ alkyl group and a branched $C_{3-5}$ hydroxyalkyl group; most preferably, a branched $C_3$ hydroxyalkyl group); providing the selected glycol ether of formula Ia; providing the selected nonionic surfactant of formula IIa; providing the selected tertiary amine; combining the selected glycol ether of formula Ia, the selected nonionic surfactant of formula IIa and the selected tertiary amine to form a concentrated hard surface cleaning composition (preferably, wherein the concentrated hard surface cleaning composition comprises: 15 to 50 wt % (preferably, 20 to 40 wt %; more preferably, 25 to 30 wt %; most preferably, 26 to 28 wt %), based on weight of the concentrated hard surface cleaning composition, of the glycol ether of formula Ia; 20 to 60 wt % (preferably, 25 to 50 wt %; more preferably, 30 to 40 wt %; most preferably, 34 to 38 wt %), based on weight of the concentrated hard surface cleaning composition, of the nonionic surfactant of formula IIa; and 15 to 60 wt % (more preferably, 20 to 50 wt %; still more preferably, 25 to 40 wt %; most preferably, 27 to 34 wt %), based on weight of the concentrated hard surface cleaning composition, of the tertiary amine); forming the hard surface cleaning concentrate packet by disposing the concentrated hard surface cleaning composition within an enclosed volume formed by the water soluble film (preferably, wherein the water soluble film is configured into a water soluble film pouch)(the water soluble film pouch may have one or multiple cavities for receiving the concentrated hard surface cleaning composition, or portion thereof) (preferably, the water soluble film pouch has one cavity for receiving the concentrated hard surface cleaning composition), wherein the water soluble film encapsulates the concentrated hard surface cleaning composition.

Preferably, the water soluble film pouch used in the hard surface cleaning concentrate packet of the present invention forms a sealed container containing the concentrated hard surface cleaning composition. The sealed container can be formed from the water soluble film by any suitable method, including thermoforming, heat sealing, solvent welding and use of adhesive sealing solutions (e.g., with use of a water-soluble adhesive).

This disclosure also provides a method of forming the encapsulated cleaning composition. The method includes the step of providing a water soluble film, providing a concentrated hard surface cleaning composition and disposing (e.g., pouring, inserting, injecting or otherwise placing) the concentrated cleaning composition within a containment volume (or containment volumes) formed using the water soluble film.

Preferably, the water soluble film pouch used in the hard surface cleaning concentrate packet of the present invention is stable in the presence of the concentrated hard surface cleaning composition. In use, the hard surface cleaning concentrate packet of the present invention is combined with a dilution water. Following combination with the dilution water, the water soluble film readily disintegrates, releasing the concentrated hard surface cleaning composition into the dilution water to form a hard surface cleaning use composition. Preferably, the volume ratio between the concentrated hard surface cleaning composition and the dilution water of 1:1,000 (preferably, 1:5 to 1:500; more preferably, 1:7.5 to 1:250; still more preferably, 1:10 to 1:150; most preferably, 1:15 to 1:50).

Preferably, the method of removing oily, greasy, tough and stubborn soils from a hard surface of the present invention, comprises: providing a soiled hard surface (preferably, wherein the soiled hard surface is selected from the group consisting of a counter top surface, a cook top surface, a ceramic surface, a laminate surface, a porcelain surface, a tile surface, a glass surface, a metal surface, a wood surface; preferably, the soiled hard surface is a nonporous surface) (preferably, the soiled hard surface is soiled with at least one of an oily soil or a greasy soil); providing a container (preferably, a volume specific container designed for the surface cleaning task); providing a dilution water (preferably, distilled water); selecting a hard surface cleaning concentrate packet prepared according to the method of the present invention; providing the selected hard surface cleaning concentrate packet; combining (optionally, combining with at least one of agitation and heat) the selected hard surface cleaning concentrate packet and the dilution water in the container (preferably, wherein the container is a volume specific spray bottle designed to receive a measured volume of dilution water and the hard surface cleaning concentrate packet) to form a hard surface cleaning use composition; wetting the soiled hard surface with the hard surface cleaning use composition; and wiping (optionally, rubbing; optionally, scrubbing) the wetted soiled hard surface (preferably with an implement selected from the group consisting of a cloth, towel, wipe, brush, mop, wiper, squeegee, sponge or a combination thereof) to provide a cleaned hard surface.

Some embodiments of the present invention will now be described in detail in the following Examples.

Comparative Examples C1-C10 and Examples 1-2

Concentrated Hard Surface Cleaning Composition

Concentrated hard surface cleaning compositions of Comparative Examples $C_1$-$C_{10}$ and Examples 1-2 were prepared by mixing together the components in the weight proportions noted in TABLE 1.

TABLE 1

| | Solvent (wt %) | | | Surfactant (wt %) | | Amine (wt %) | | |
|---|---|---|---|---|---|---|---|---|
| Example | A | B | C | D | E | F | G | H |
| C1 | 27.4 | 0 | 0 | 36.3 | 0 | 36.3 | 0 | 0 |
| C2 | 0 | 27.4 | 0 | 36.3 | 0 | 36.3 | 0 | 0 |
| C3 | 27.4 | 0 | 0 | 0 | 36.3 | 36.32 | 0 | 0 |
| C4 | 0 | 27.4 | | 0 | 36.3 | 36.3 | 0 | 0 |
| C5 | 27.4 | 0 | 0 | 36.3 | 0 | 0 | 36.3 | 0 |
| C6 | 27.4 | 0 | 0 | 0 | 36.3 | 0 | 36.3 | 0 |
| C7 | 0 | 27.4 | 0 | 36.3 | 0 | 0 | 36.3 | 0 |
| C8 | 0 | 27.4 | 0 | 0 | 36.3 | 0 | 36.3 | 0 |
| C9 | 0 | 0 | 27.4 | 0 | 36.3 | 0 | 0 | 36.3 |
| 1 | 0 | 27.4 | 0 | 0 | 36.3 | 0 | 0 | 36.3 |
| 2 | 27.4 | 0 | 0 | 0 | 36.3 | 0 | 0 | 36.3 |

A-Hexyl Carbitol available from The Dow Chemical Company
B-Dowanol ™ DPnB Dipropylene glycol mono butyl ether available available from The Dow Chemical Company
C-Dowanol ™ DPM Dipropylene glycol mono methyl ether available available from The Dow Chemical Company
D-Ecosurf ™ EH-9 biodegradable, nonionic surfactant available from The Dow Chemical Company
E-Tergitol ™ 15-S-9 biodegradable, seconday alcohol ethoxylate available from The Dow Chemical Company
F-Monoisopropanol amine
G-Diisopropanol amine
H-Triisopropanol amine (TIPA) LFG 85 available from The Dow Chemical Company

Soil Removal Tests

The soil removal performance of concentrated hard surface cleaning compositions of Comparative Examples C2, C5, C7 and C8 and Example 1 were diluted at a 1:20 volume dilution ratio with deionized water to form the test solutions. According to IKW recommendations, 1,500 μL fat dust soil/tiles were placed in an oven set at 120° C. for 24 hours. The tiles were then removed from the oven and were kept in a climate controlled laboratory for 24 hours at room temperature before testing. The fat dust soil used was comprised of 75 wt % peanut oil, 23 wt % kaolin and 2 wt % carbon black dispersed in isopropal alcohol (20 wt % soil/80 wt % isopropal alcohol). A scrub machine was used to perform the tests. For each test, a 3 mL portion of the test solution was placed on a sponge (soft side) and then the soiled tile was stroked 10 times with the test solution wetted surface of the sponge. The tiles were then rinsed under running tap water before evaluating the test results. The cleaning formulation of Comparative Example C2 showed the best performance followed by Comparative Example C5, Comparative Example C8, Comparative Example C7 and then Example 1. Note, however, that the formulation of Comparative Example C2 gave off an ammonia odor upon dilution; the formulations of Comparative Examples C5 and C7 required heat to disperse the amine used therein; and the formulation of Comparative Example C8 required heat to disperse the amine, which precipitated back out of solution upon cooling to room temperature.

Soil Removal Tests

The soil removal performance of concentrated hard surface cleaning compositions of Comparative Example C9 and Example 2 were diluted at a 1:20 volume dilution ratio with deionized water to form the test solutions. According to IKW recommendations, 1,500 μL fat dust soil/tiles were placed in an oven set at 120° C. for 24 hours. The tiles were then removed from the oven and were kept in a climate controlled laboratory for 24 hours at room temperature before testing. The fat dust soil used was comprised of 75 wt % peanut oil, 23 wt % kaolin and 2 wt % carbon black dispersed in isopropal alcohol (20 wt % soil/80 wt % isopropal alcohol). A scrub machine was used to perform the tests. For each test, a 3 mL portion of the test solution was placed on a sponge (soft side) and then the soiled tile was stroked 10 times with the test solution wetted surface of the sponge. The tiles were then rinsed under running tap water before evaluating the test results. The cleaning formulation of Example 2 showed drastically better performance compared to that of Comparative Example C9, demonstrating the dramatic impact of solvent choice on cleaning formulation performance.

Example 3

Concentrated Hard Surface Cleaning Composition

Concentrated hard surface cleaning composition of Example 3 was prepared by mixing together the components in the weight proportions noted in TABLE 2.

TABLE 2

| Component | wt % |
|---|---|
| Biodegradable, seconday alcohol ethoxylate[1] | 35.0 |
| Triisopropanol amine[2] | 34.0 |
| Hexyl carbitol | 27.0 |
| Fragrance[3] | 3.0 |
| Yellow dye[4] | 0.9 |
| Red dye[5] | 0.1 |

[1]Tergitol ™ 15-S-9 available from The Dow Chemical Company
[2]TIPA LFG 85 available from The Dow Chemical Company
[3]Kool & Fresh available from Givaudan
[4]Liquitint Yellow EC available from Milliken Chemical
[5]Liquitint Red OC available from Milliken Chemical

Soil Removal Tests

The soil removal performance of the concentrated hard surface cleaning composition of Example 3 diluted at a 1:20 volume dilution ratio with deionized water to form the test solutions. The cleaning performance of the cleaning solution of Example 3 was compared with that of three commercial products—Mr Propre, St Marc and Ajax. According to IKW recommendations, 1,500 μL fat dust soil/tiles were placed in an oven set at 120° C. for 24 hours. The tiles were then removed from the oven and were kept in a climate controlled laboratory for 24 hours at room temperature before testing. The fat dust soil used was comprised of 75 wt % peanut oil, 23 wt % kaolin and 2 wt % carbon black dispersed in isopropal alcohol (20 wt % soil/80 wt % isopropal alcohol). A scrub machine was used to perform the tests. For each test, a 3 mL portion of the test solution was placed on a sponge (soft side) and then the soiled tile was stroked 10 times with the test solution wetted surface of the sponge. The tiles were then rinsed under running tap water before evaluating the test results. The cleaning formulation of Example 3 significantly outperformed each of the commercial formulations on the tested fat dust soil.

We claim:

1. A hard surface cleaning concentrate packet, comprising:

a water soluble film;

a concentrated hard surface cleaning composition, comprising:

15 to 50 wt %, based on weight of the concentrated hard surface cleaning composition, of a glycol ether of formula I $$R^1—O—[CH_2CH(R^2)O]_a—H \quad (I)$$

wherein $R^1$ is a linear or branched $C_{2-8}$ alkyl group; wherein each $R^2$ is independently selected from the group consisting of a hydrogen and a methyl group; and wherein a is 1 to 3;

20 to 60 wt %, based on weight of the concentrated hard surface cleaning composition, of a nonionic surfactant of formula II (II)

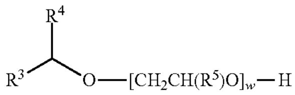

wherein w is an average of 5 to 40; wherein $R^3$ is selected from the group consisting of a hydrogen and a linear or branched $C_{1-20}$ alkyl group; wherein $R^4$ is selected from the group consisting of a linear or branched $C_{1-20}$ alkyl group and a linear or branched $C_{1-4}$ hydroxyalkyl group; wherein each $R^5$ is independently selected from the group consisting of a hydrogen, a methyl group, an ethyl group, a n-propyl group, an iso-propyl group, a n-butyl group, a 2-butyl group and a 2-methyl-2-butyl group; and with the proviso that sum of the total number of carbon atoms in $R^3$ and $R^4$ is 5 to 21; and 15 to 60 wt %, based on weight of the concentrated hard surface cleaning composition, of a tertiary amine;

wherein the water soluble film encapsulates the concentrated hard surface cleaning composition.

2. The hard surface cleaning concentrate packet of claim 1, wherein the tertiary amine is of formula III

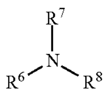

wherein $R^6$, $R^7$ and $R^8$ are independently selected from the group consisting of a linear or branched $C_{1-20}$ alkyl group and a linear or branched $C_{1-20}$ hydroxyalkyl group.

3. The hard surface cleaning concentrate packet of claim 2, wherein $R^1$ is a linear $C_{4-7}$ alkyl group; wherein a is 2.

4. The hard surface cleaning concentrate packet of claim 3, wherein w is an average of 8 to 16; wherein $R^3$ is a linear $C_{1-15}$ alkyl group; wherein $R^4$ is a linear $C_{1-15}$ alkyl group; with the proviso that the sum of the total number of carbon atoms in $R^3$ and $R^4$ is 6 to 20.

5. The hard surface cleaning concentrate packet of claim 4, wherein $R^6$, $R^7$ and $R^8$ are independently selected from the group consisting of a linear or branched $C_{1-10}$ alkyl group and a linear or branched $C_{1-10}$ hydroxyalkyl group.

6. The hard surface cleaning concentrate packet of claim 5, wherein $R^6$, $R^7$ and $R^8$ are independently selected from the group consisting of a linear or branched $C_{1-10}$ hydroxyalkyl group.

7. The hard surface cleaning concentrate packet of claim 5, wherein $R^6$, $R^7$ and $R^8$ are independently selected from the group consisting of a branched $C_{3-5}$ alkyl group and a branched $C_{3-5}$ hydroxyalkyl group.

8. The hard surface cleaning concentrate packet of claim 7, wherein $R^6$, $R^7$ and $R^8$ are a branched $C_3$ hydroxyalkyl group.

9. A method of making a hard surface cleaning concentrate packet, comprising:

providing a water soluble film;

selecting a glycol ether of formula I $$R^1—O—[CH_2CH(R^2)O]_a—H \quad (I)$$

wherein $R^1$ is a linear or branched $C_{2-8}$ alkyl group; wherein each $R^2$ is independently selected from the group consisting of a hydrogen and a methyl group; and wherein a is 1 to 3;

selecting a nonionic surfactant of formula II (II)

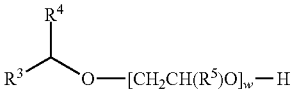

wherein w is an average of 5 to 40; wherein $R^3$ is selected from the group consisting of a hydrogen and a linear or branched $C_{1-20}$ alkyl group; wherein $R^4$ is selected from the group consisting of a linear or branched $C_{1-20}$ alkyl group and a linear or branched $C_{1-4}$ hydroxyalkyl group; wherein each $R^5$ is independently selected from the group consisting of a hydrogen, a methyl group, an ethyl group, a n-propyl group, an iso-propyl group, a n-butyl group, a 2-butyl group and a 2-methyl-2-butyl group; and with the proviso that sum of the total number of carbon atoms in $R^3$ and $R^4$ is 5 to 21; and selecting a tertiary amine;

providing the selected glycol ether of formula I;

providing the selected nonionic surfactant of formula II;

providing the selected tertiary amine;

combining the selected glycol ether of formula I, the selected nonionic surfactant of formula II and the selected tertiary amine to form a concentrated hard surface cleaning composition;

forming the hard surface cleaning concentrate packet by disposing the concentrated hard surface cleaning composition within an enclosed volume formed by water soluble film, wherein the water soluble film encapsulates the concentrated hard surface cleaning composition.

10. A method for removing oily, greasy, tough and stubborn soils from a hard surface, comprising:

providing a soiled hard surface;

providing a container;

providing a dilution water;

selecting a hard surface cleaning concentrate packet prepared according to the method of claim 9;

providing the selected hard surface cleaning concentrate packet;

combining the selected hard surface cleaning concentrate packet and the dilution water in the container to form a hard surface cleaning use composition;

wetting the soiled hard surface with the hard surface cleaning use composition; and wiping the wetted soiled hard surface to provide a cleaned hard surface.

11. The hard surface cleaning concentrate packet of claim 8, wherein the concentrated hard surface cleaning composition, comprises:

20 to 40 wt %, based on weight of the concentrated hard surface cleaning composition, of the glycol ether of formula I;

25 to 50 wt %, based on weight of the concentrated hard surface cleaning composition, of the nonionic surfactant of formula II; and 20 to 50 wt %, based on weight of the concentrated hard surface cleaning composition, of the tertiary amine.

12. The hard surface cleaning concentrate packet of claim 8, wherein the concentrated hard surface cleaning composition, comprises:

25 to 30 wt %, based on weight of the concentrated hard surface cleaning composition, of the glycol ether of formula I;

30 to 40 wt %, based on weight of the concentrated hard surface cleaning composition, of the nonionic surfactant of formula II; and 25 to 40 wt %, based on weight of the concentrated hard surface cleaning composition, of the tertiary amine.

13. The hard surface cleaning concentrate packet of claim 8, wherein the concentrated hard surface cleaning composition, comprises:

26 to 28 wt %, based on weight of the concentrated hard surface cleaning composition, of the glycol ether of formula I;

34 to 38 wt %, based on weight of the concentrated hard surface cleaning composition, of the nonionic surfactant of formula II; and 27 to 34 wt %, based on weight of the concentrated hard surface cleaning composition, of the tertiary amine.

* * * * *